March 6, 1951        P. A. OSTROW        2,544,635
AUXILIARY STEERING WHEEL FOR
DUAL CONTROL AUTOMOBILES
Filed Aug. 12, 1950
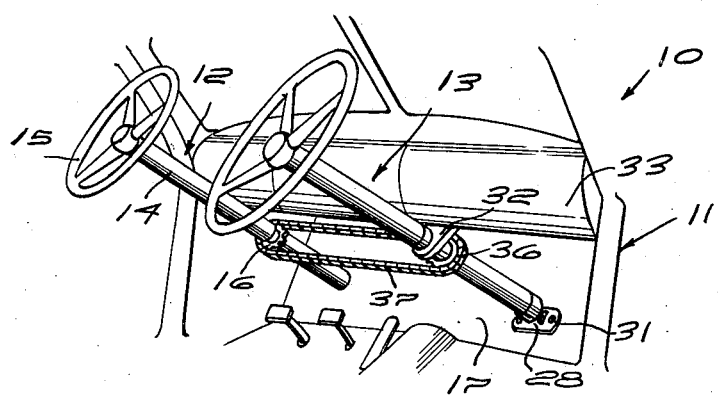
FIG. 1
FIG. 2
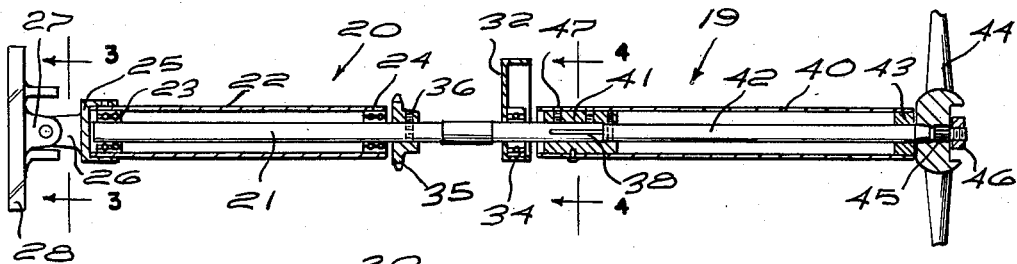
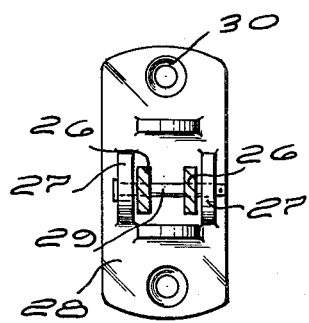
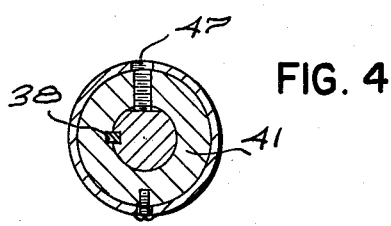
FIG. 4
FIG. 3
*INVENTOR.*
Philip A. Ostrow
BY
*Barlow & Barlow*
ATTORNEYS.

Patented Mar. 6, 1951

2,544,635

UNITED STATES PATENT OFFICE 2,544,635

AUXILIARY STEERING WHEEL FOR DUAL CONTROL AUTOMOBILES

Philip A. Ostrow, Providence, R. I.

Application August 12, 1950, Serial No. 179,030

3 Claims. (Cl. 74—494)

1

This invention relates to the dual control of an automobile for the use in teaching automobile driving to a pupil.

Heretofore, a second wheel has been installed in a standard automobile and so connected with the steering mechanism that operation of the road wheels could be had from either steering wheel, such wheel was more or less permanently mounted in the automobile and did not permit of easy removal. Many times in the training of students it is desirable that they be permitted to drive without the second control in position for the easy grasp of the teacher so as to give the student more confidence.

One of the objects of this invention is to provide a mechanism which may be easily detached so that the hand manipulated steering wheel is removed from the position where the teacher may easily grasp the same that the student may visually know reliance is entirely placed in him.

Another object of this invention is to provide the auxiliary steering mechanism in two parts with the parts which are utilized for connection with the main steering mechanism more or less permanently mounted in the car while the part of the steering column which comprises the hand manipulated part may be easily removed so that it cannot be grasped by the teacher or will not be in the way in case the automobile is desired to be converted back to the standard single wheel drive.

With these and other objects in view, the invention consists of certain novel features of construction, as will be more fully described and particularly pointed out in the appended claims.

In the acocmpanying drawings:

Figure 1 is a perspective view of a portion of an automobile equipped with the dual control which is the subject of this invention;

Figure 2 is a central sectional view through the auxiliary steering mechanism;

Figure 3 is a section on line 3—3 of Figure 2;

Figure 4 is a section on line 4—4 of Figure 2.

In proceeding with this invention, I have provided a steering column which is divided in two parts. The lower of these two parts is fixed on the fire wall of the automobile and has a chain extending over to the main steering mechanism for the transmission of motion between the two. The upper part of the auxiliary steering column is removable from above this chain connection and this part carries the hand steering wheel. There is a spline connection between the two parts of the auxiliary steering column so that it is merely necessary to fit the two parts together to cause a driving connection to be had between the two and then secure these parts in place by screws.

With reference to the drawings, 10 designates a portion of an automobile comprising generally a fire wall 11 between the driver's seat and the engine. The main steering mechanism is designated 12 and the auxiliary steering mechanism is designated 13. The main steering mechanism comprises a column 14 and hand steering wheel 15 into which column there is interposed a gear 16 secured to a shaft within the column 14 which shaft is turned by the steering wheel 15. This column proceeds through the inclined portion 17 of the fire wall for the control of the road wheels at the front of the vehicle.

The auxiliary steering mechanism comprises two parts one of which parts is designated 19 and the other part is designated 20 as shown in Figure 2. The part 20 comprises a shaft 21 which is rotatably mounted in a casing 22 by means of ball bearings 23 and 24 at either end thereof. This casing 22 is mounted in a cup 25 which has a pair of ears 26 projecting therefrom with openings to align with openings in ears 27 standing upward from the base plate 28 so as to receive a pivot pin 29 and rockably mount the casing and shaft 21 on this base plate 28. This base plate is secured to the fire wall portion 17 by means of openings 30 and bolts 31 so that the lower portion of the auxiliary steering column 13 may be rockably mounted on this fire wall to project at the desired angle therefrom.

A bracket 32 is secured to the dash 33 of the automobile and is provided with a ball bearing 34 for rotatably mounting the upper portion of the shaft 21. This shaft 21 has a sprocket gear 35 fixed to it by means of a screw 36 located just beyond the end of the casing 22 and a sprocket chain 37 engages both gears 16 and 36 so that the motion of one gear will be transmitted to the other gear and the main steering column shaft may be rotated with the road wheels of the vehicle. The end of the shaft 21 is provided with one or more keys or splines 38.

The upper part 19 of the auxiliary steering mechanism comprises a tube 40 within which a shaft 42 is positioned by means of a sleeve 41 at one end to receive the shaft and a bushing 43 at the other end of the tube through which it projects and has a hand steering wheel 44 secured thereon by means of a spline 45 and a nut 46. The lower end of this sleeve 41 provides a socket with its walls grooved or recessed so as to receive the tongue or spline 38 telescopically within it to be held in such position by screws 47 when so assembled.

If it is desired to remove the auxiliary steering wheel it is merely necessary to loosen screws 47 and slide the section 19 off of the shaft 21, the lower section 22 being substantially under the dash is not operative and is not in the way of the person sitting beside the driver who uses the main steering column.

I claim:

1. In an automobile having a dash and a fire wall between the engine and driver, a dual steering control mechanism with main and auxiliary steering posts, said main steering post having a shaft with a gear fixed thereon, a bearing fixed to said dash, said auxiliary steering post comprising upper and lower parts, said lower part comprising a shell mounted on said fire wall and a shaft rotatably mounted in said shell and in said bearing, a gear on said auxiliary shaft between said bearing and said fire wall, a sprocket chain connecting said gears to cause said shafts to rotate together, said upper part of the auxiliary post having a shaft with a steering wheel at its upper end and a coupling at its lower end detachably connected to the end of the shaft of said lower part, the point of connection of said upper and lower parts being above but adjacent the bearing on said dash whereby when the coupling is disconnected said upper part may be removed leaving the area rearward of the dash substantially free of one steering control mechanism.

2. In an automobile as in claim 1 wherein said lower part of the auxiliary steering post is rockably mounted on the fire wall.

3. In an automobile as in claim 1 wherein the coupling between the lower end of the upper shaft and the lower shaft is a spline connection so that the two shafts will turn together.

PHILIP A. OSTROW.

REFERENCES CITED

The following references are of record in the file of this patent:

UNITED STATES PATENTS

| Number | Name | Date |
|---|---|---|
| 1,932,315 | Klock | Oct. 24, 1933 |

FOREIGN PATENTS

| Number | Country | Date |
|---|---|---|
| 613,437 | France | Nov. 17, 1926 |
| 667,775 | France | June 25, 1929 |